US012793602B2

(12) United States Patent
Lee et al.

(10) Patent No.: US 12,793,602 B2
(45) Date of Patent: Nov. 10, 2026

(54) SELECTIVE PIXEL REFRESH FOR DISPLAY POWER SAVING

(71) Applicant: Microsoft Technology Licensing, LLC, Redmond, WA (US)

(72) Inventors: Ki Chan Lee, Redmond, WA (US); Stuart William Milton, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/911,046

(22) Filed: Oct. 9, 2024

(65) Prior Publication Data

US 2026/0100154 A1 Apr. 9, 2026

(51) Int. Cl.
*G09G 3/20* (2006.01)

(52) U.S. Cl.
CPC ... *G09G 3/2092* (2013.01); *G09G 2300/0814* (2013.01); *G09G 2310/0267* (2013.01); *G09G 2310/0275* (2013.01); *G09G 2330/021* (2013.01)

(58) Field of Classification Search
CPC ......... G09G 3/2092; G09G 2300/0814; G09G 2310/0267; G09G 2310/0275; G09G 2330/021; G09G 2310/04; G09G 3/20
See application file for complete search history.

(56) References Cited

U.S. PATENT DOCUMENTS

| | | | | |
|---|---|---|---|---|
| 2007/0057877 | A1* | 3/2007 | Choi | G09G 3/3291 345/76 |
| 2010/0265168 | A1* | 10/2010 | Neugebauer | G09G 3/3614 345/87 |
| 2011/0025679 | A1* | 2/2011 | Park | G09G 3/3266 345/213 |
| 2021/0287599 | A1* | 9/2021 | Kim | G09G 3/3233 |
| 2023/0176433 | A1 | 6/2023 | Yamazaki | |
| 2024/0304139 | A1* | 9/2024 | Zong | G09G 3/3225 |

FOREIGN PATENT DOCUMENTS

CN 118197234 A 6/2024

OTHER PUBLICATIONS

International Search Report and Written Opinion received for PCT Application No. PCT/US2025/036545, mailed on Oct. 15, 2025, 13 pages.

* cited by examiner

*Primary Examiner* — Jose R Soto Lopez
(74) *Attorney, Agent, or Firm* — Holzer Patel Drennan

(57) ABSTRACT

An image processing unit may select a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected. An image processing unit may refresh, based at least in part on receiving a pixel refresh signal, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

19 Claims, 10 Drawing Sheets

SELECTIVE PIXEL REFRESH FOR DISPLAY POWER SAVING

BACKGROUND

Computing device displays include gate driver circuitry and source driver circuitry that refresh pixels row-by-row, eventually refreshing all of the rows in a frame and then repeating the refresh process for the next frame.

SUMMARY

In some aspects, the techniques described herein relate to a method of selectively refreshing a pixel in a line of pixels of a display, the method including: selecting a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and refreshing, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

In some aspects, the techniques described herein relate to one or more tangible processor-readable storage media embodied with instructions for executing on one or more processors and circuits of a computing device a process for selectively refreshing a pixel in a row of pixels of a display, the process including: selecting a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and refreshing, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

In some aspects, the techniques described herein relate to a computing system for selectively refreshing a pixel in a row of pixels of a display, the computing system including: one or more hardware processors; a pixel selector executable by the one or more hardware processors and configured to select a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and a pixel refresher executable by the one or more hardware processors and configured to refresh, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTION

Display pixel architectures include gate driver circuitry that enables refreshing (e.g., providing updated content data) of all pixels in a line (e.g., a row, a column) of pixels with content data received for each pixel via source driver circuitry. For example, display pixel architectures couple each row of pixels to a gate driver using a corresponding gate driver line and couple each column of pixels to a source driver using a corresponding source driver line. Each of the pixels of a row includes refresh circuitry that includes a transistor that can be turned on via the gate driver line. The gate driver completes, using the corresponding gate driver line of the refresh circuitry, a circuit along a corresponding source line of each pixel of the row of pixels. All of the row's pixels are then able to receive updated content from the source driver via source driver lines connecting the pixel (and other pixels of the corresponding column) to the source driver. For example, completing the circuit along the source line enables content to be received at the pixels via the source driver lines. Accordingly, in some display pixel architectures, a whole line of pixels is refreshed using the refresh circuitry, even if only a subset of pixels of the line of pixels needs refreshing with updated content data. This process consumes power to refresh all of the pixels in a line, even if the content of all pixels in the line has not changed.

The described technology addresses the deficiencies of the complete-line-refresh used in display architectures, providing selector circuitry within the display architecture to enable targeted refreshing of selected pixels in a line of pixels, including a proper subset (e.g., one, two, or another number of pixels less than the total) of pixels within the line of pixels. Accordingly, the described technology results in reduced power consumption and extended battery life of electronic devices compared to complete-line-refreshing, which requires refreshing an entire line of pixels or a whole panel of pixels. Furthermore, the described technology provides an ability to refresh individual pixels selectively, rather than refreshing entire lines or panels of pixels, thereby allowing a display system to refresh only the pixels for which content data has changed, leaving the other pixels unchanged. Particularly in scenarios where few (e.g., one or two) pixels of a line of pixels require refreshing, the described technology provides significant power savings over approaches that needlessly refresh other pixels of the line that do not need updated content data.

Figure 1:
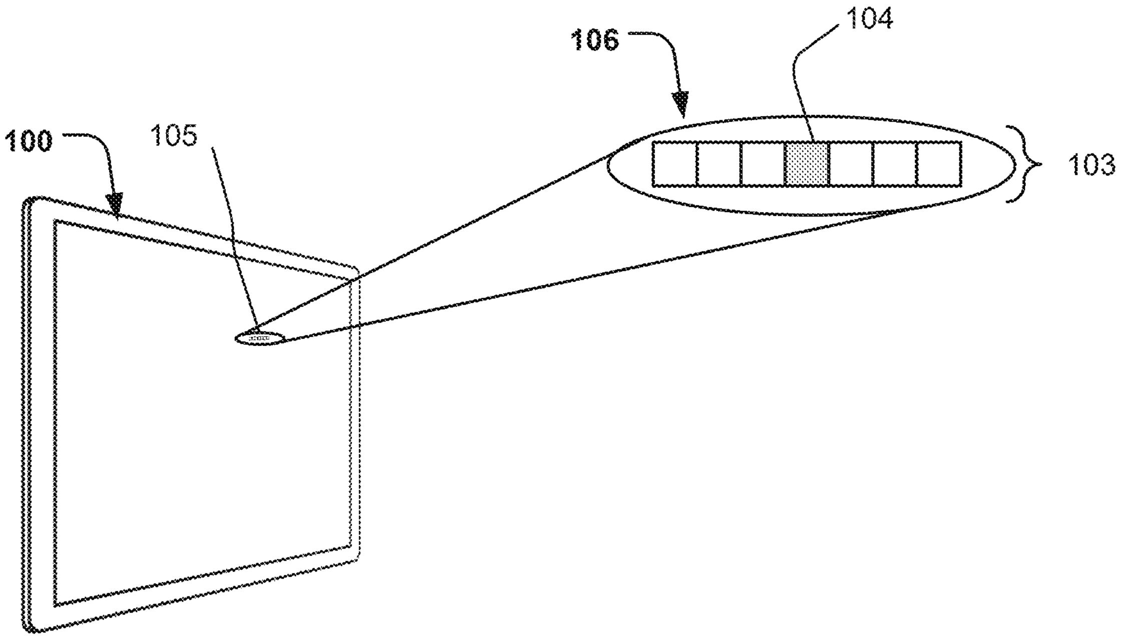
FIG. 1 illustrates an example of refreshing content data of a selected pixel within a line of pixels of a display panel of an electronic device.

FIG. 1 illustrates an example of refreshing content data of a selected pixel 104 within a line 103 of pixels of a display panel 105 of an electronic device 100. For example, a line of pixels (e.g., line 103) is a row of pixels, a column of pixels, or other contiguous set of pixels of a display panel 105. The display panel 105 can render an image using content data provided by a source driver using source driver lines. Further, a gate driver of the display panel 105 can enable lines of pixels to receive updated content data on a per-line basis via refresh circuitry. For example, refresh circuitry may include a gate driver line for the line of pixels and a transistor along a corresponding source line of each pixel that is connected to the gate driver line.

The expanded view 106 depicts a line 103 of pixels of multiple lines of pixels of the display panel 105. A portion of the line 103 of pixels is represented as boxes in FIG. 1. Within the line 103 of pixels, a selected pixel 104 is refreshed with content data, as indicated in FIG. 1 by the crosshatched box. The described technology enables the selection of the selected pixel 104 so that the content data of the selected pixel 104 is refreshed without refreshing the content data of the other pixels of the line 103 of pixels, which are depicted in FIG. 1 as unfilled boxes.

The described technology provides selector circuitry that enables selecting a subset of pixels of a line (e.g., line 103) so that only the selected subset of pixels is refreshed when a refresh signal is sent via the refresh circuitry. In some implementations, the selector circuitry provides one or more of an additional gate driver line per line of pixels (e.g., line 103), an additional set of source driver lines that each connects to a corresponding pixel of the line of pixels, and an additional transistor along a source driver line that connects to each pixel to implement pixel select signals. In some implementations, pixels are initially locked and unable to receive content data via source driver lines even when receiving a refresh signal via the refresh circuitry. The pixels remain locked until pixel select signals are sent via the selector circuitry to unlock the selected pixels of the line of pixels. Unlocking the selected pixels of the line of pixels can include using the selector circuitry to complete circuits between an input of refresh circuitry of the selected pixels of the line of pixels and the source driver. Accordingly, when the gate driver sends a signal to update the row of pixels using the refresh circuitry, only the selected pixels have a completed circuit between the pixel and the source driver. However, pixels of the row that were not selected via the pixel select signals remain locked, and content data cannot reach an input of the refresh circuitry for the unselected pixels. Accordingly, unselected pixels of the line of pixels do not receive updated content data responsive to the gate driver sending the refresh signal to update the line of pixels via the refresh circuitry.

The selector circuitry of the described technology may be implemented in a liquid crystal display (LCD), a light emitting diode (LED) based display, an organic light emitting diode (OLED) based display, or other display technology.

In one implementation of the described technology, selector circuitry includes an additional gate driver line per pixel line and an additional transistor along a source driver line of the pixel compared to certain display architectures, and pixel select signals are sent using the gate driver. In some implementations, selector circuitry includes an additional set of source driver lines and an additional transistor along a source driver line of the pixel compared to certain display architectures, and pixel select signals are sent using the source driver.

Figure 2:
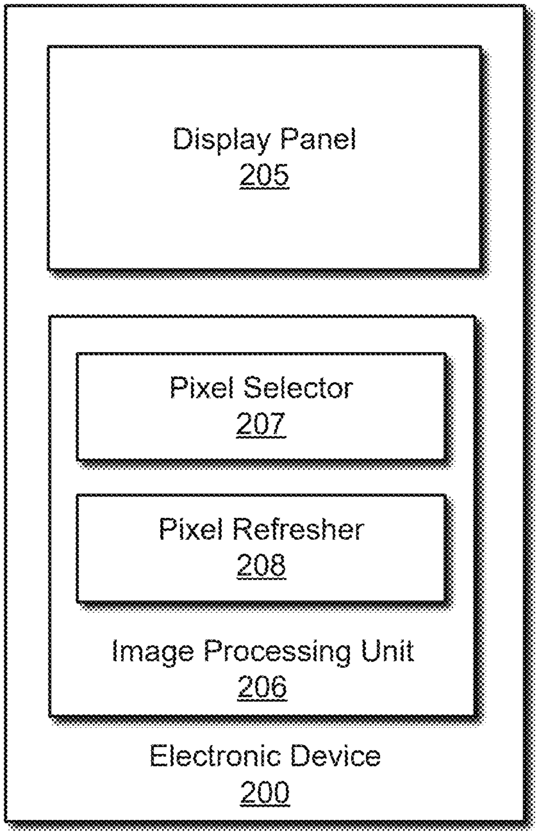
FIG. 2 illustrates an example of an electronic device, including an image processing unit, that renders images via a display panel.

FIG. 2 illustrates an example of an electronic device 200, including an image processing unit 206, that renders images via a display panel 205.

In some implementations, as depicted in FIG. 2, the display panel 205 is integrated into the electronic device 200 (e.g., a tablet computing device, a smartphone, etc.), along with other hardware components. In some implementations, the display panel 205 is in a separate unit (e.g., a monitor) from the electronic device 200 (e.g., a desktop computer) and is communicatively coupled (e.g., directly via hardware interface or indirectly via a network connection) to the electronic device 200. A processer (e.g., a central processing unit) of the electronic device 200 sends image data to an image processing unit 206 (e.g., a graphics processing unit), which translates the image data into content data (e.g., bitmaps) for display via pixels of the display panel 205. The image processing unit 206 transmits the content data to the display panel 205. In some implementations, the image processing unit 206 performs computationally intensive functions to ensure that the display panel 205 receives content data to represent the image data accurately. In some implementations, the content data includes a sequence of bits that describe the color values (e.g., RGB color values) for specific coordinates (e.g., X and Y values) defining pixels of the display panel 205, starting from a given location on the screen. In some implementations, the image processing unit 206 provides the content data to a source driver of the display panel 205. In some implementations, the image processing unit 206 provides updated content data, for example, the image processing unit 206 provides content data corresponding to each subsequent video frame.

In some implementations, the image processing unit 206 includes a pixel selector 207 and a pixel refresher 208. The pixel selector 207 communicates with the display panel 205 and uses the selector circuitry of the display panel to select a subset of a line of pixels. In some implementations, the pixel selector 207 compares content data (e.g., a first frame of a video) to subsequent content data (e.g., a second frame of the video) to determine which pixels of the display panel 205 need to be updated (e.g., refreshed). For example, one or more pixels in the subsequent content data have different color values than the same one or more pixels in the content data, and the pixel selector 207 uses selector circuitry to select the one or more pixels and uses the selector circuitry of the display panel 205 to send pixel select commands to the selected one or more pixels. For example, the pixel selector 207 selects a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected.

The pixel refresher 208 transmits a refresh command using the display panel 205 (e.g., using a gate driver of the display panel 205 and refresh circuitry of one or more lines of pixels) to refresh one or more lines of the display panel 205. Responsive to the pixel refresher 208 transmitting a refresh command to a line of pixels, only the pixels that received the pixel select command from the pixel selector 207 in the line of pixels are refreshed. For example, the pixel refresher 208 refreshes, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

Figure 3:
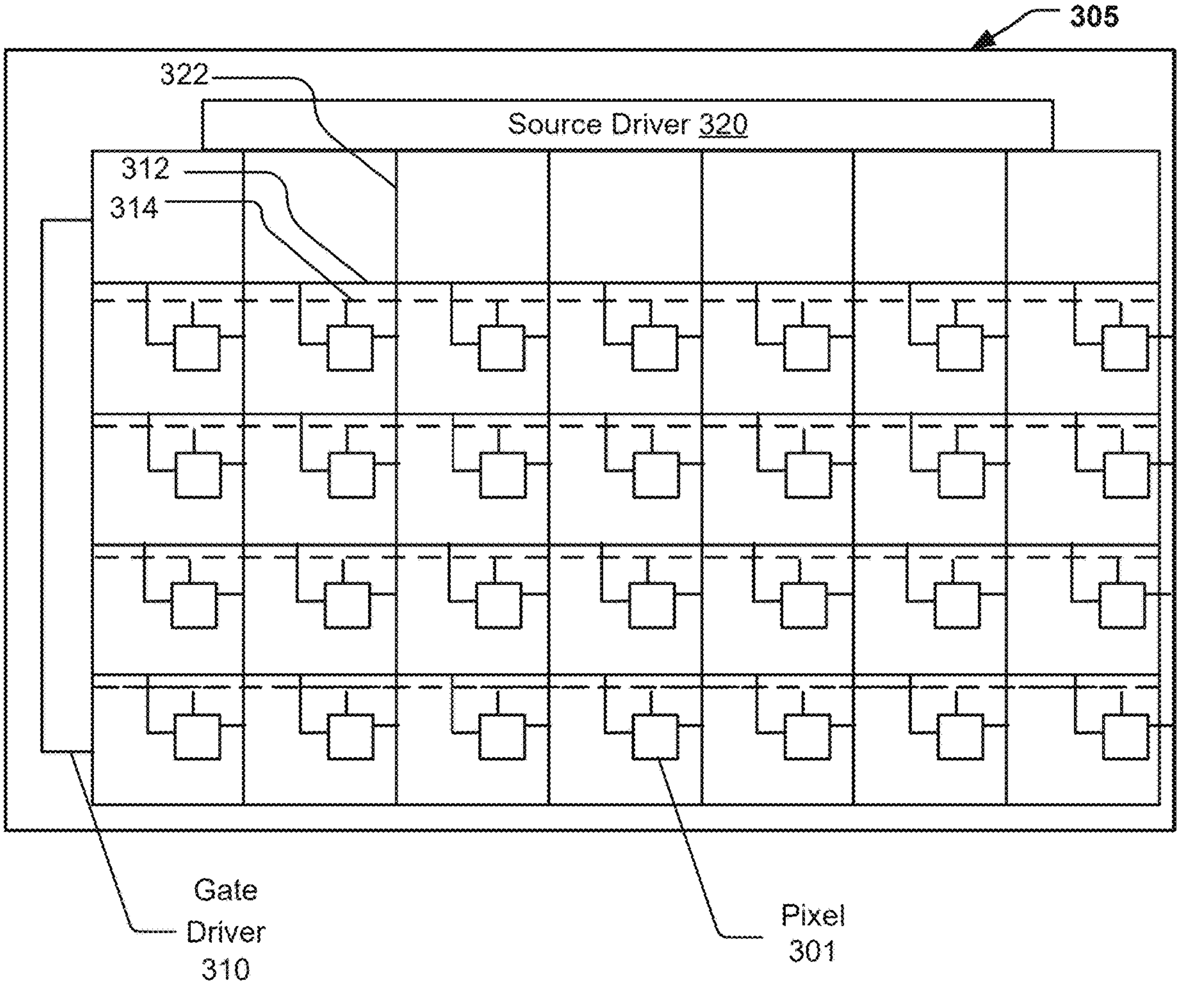
FIG. 3 illustrates an example of selector circuitry and pixels in a display panel of an electronic device.

FIG. 3 illustrates an example of selector circuitry and pixels in a display panel 305 of an electronic device. The display panel 305 includes a set of pixels (e.g., pixel 301), represented as boxes in FIG. 3. The display panel 305 includes a source driver 320 and a plurality of content data lines (e.g., content data line 322). The content data lines are source driver lines. Each of the content data lines couples pixels of a corresponding line (e.g., column) of pixels to the source driver 320. The source driver 320 provides content data to pixels of a column of pixels via the corresponding content data line (e.g., the content data line 322). The content data may include a color value for each pixel, such as a red-green-blue (RGB) color value. The content data may represent an image, video frame, display background, or other visual data.

The display panel 305 includes a gate driver 310 and a plurality of pixel refresh lines (e.g., pixel refresh line 312). The pixel refresh lines are gate driver lines. Each of the pixel refresh lines couples pixels of a corresponding line (e.g., row) of pixels to the gate driver 310.

Selector circuitry includes a set of pixel select lines (e.g., pixel select line 314) per line of pixels. The pixel select lines (e.g., pixel select line 314) and the pixel refresh lines (e.g., pixel refresh line 312) are gate driver lines. The pixel select lines (e.g., pixel select line 314) are represented in FIG. 3 with dashed lines and the pixel refresh lines are represented in FIG. 3 with solid lines. The selector circuitry may further comprise one or more transistors, capacitors, or other circuitry components for each pixel that are coupled to the pixel select lines. In some implementations, until a pixel select signal is received to select one or more pixels of a line of pixels via a corresponding pixel select line, the selector circuitry prevents content data from reaching an input of refresh circuitry of the pixels. Accordingly, even if a refresh signal is received for the line of pixels, no pixels of the line of pixels can receive content data from their corresponding content data lines without also receiving a select signal In some examples, a subset (e.g., a single pixel or a plurality of pixels but less than all of the pixels) of pixels of a line of pixels are selected using the selector circuitry. In some examples, all pixels of a line of pixels are selected using the selector circuitry. Sending the pixel select signal may complete a circuit between an input of refresh circuitry of the selected pixel(s) and the source driver along the content data line. Completing the circuit may include turning on the one or more transistors, charging one or more capacitors, or otherwise applying a voltage to one or more components of the selector circuitry. Sending the pixel select signal enables content data from content data lines coupled to the selected pixels to be received at an input of corresponding refresh circuitry of the selected pixels. A refresh signal received at each pixel of the line of pixels via the refresh circuitry completes a circuit between an input of the refresh circuitry and the pixel along the content data line. Accordingly, only pixels receiving the pixel select signal via the selector circuitry have a complete circuit between the source driver and the pixel along the content data line responsive to receiving the pixel refresh signal. Therefore, the refresh signal, which turns on the refresh switch for each pixel of the row, is only effective for establishing a connection from the source driver to one or more selected pixels of the row having their select switches turned on using the select signal.

Figure 4:
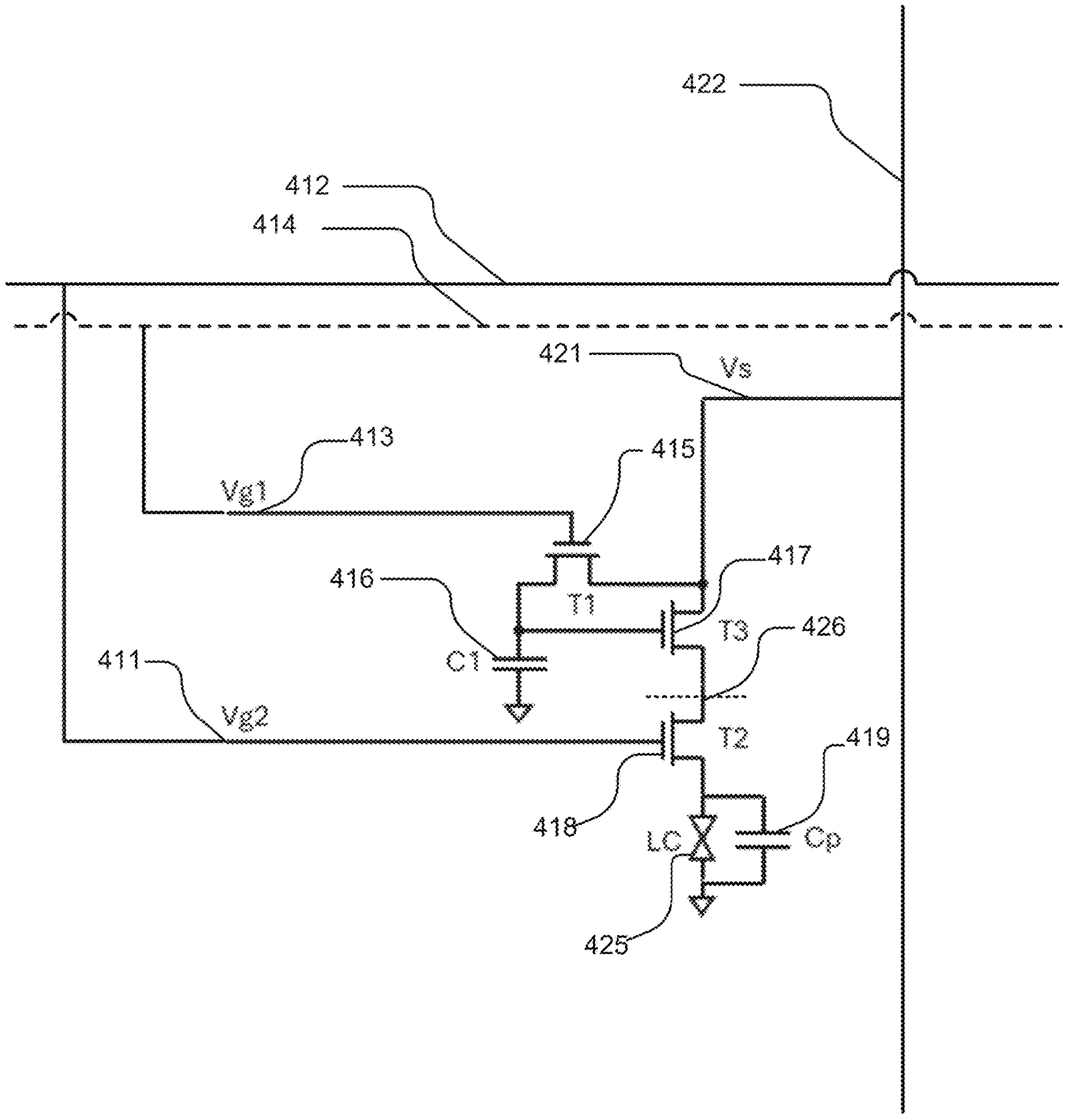
FIG. 4 illustrates an example of selector circuitry for a pixel in a display of an electronic device.

FIG. 4 illustrates an example of selector circuitry for a pixel in a display of an electronic device. The pixel is coupled to a pixel refresh line 412 via a first gate input 413 (Vg1) and to a content data line 422 via source driver output 421 (Vs). In this implementation, the pixel refresh line 412 is a gate driver line, and the content data line 422 is a source driver line.

The selector circuitry includes the pixel select line 414, represented in FIG. 4 as a dashed line. In this implementation, the pixel select line 414 is a gate driver line. The selector circuitry also includes a transistor 417 (T3) along the source driver output 421 (Vs), a capacitor 416 (C1), and a transistor 415 (T1), which is coupled to the pixel select line 414 via the first gate input 413 (Vg1).

The selector circuitry involves a pixel circuit and Source/Gate driving scheme for individual pixel control and refresh. In the pixel circuit depicted in FIG. 4, the transistor 417 (T3) is cascaded to the transistor 418 (T2) from the source driver output 421 (Vs). Accordingly, the transistor 417 and the transistor 418 act as switches to control the pixel voltage of the liquid crystal 425 (LC) and the capacitor 419 (Cp). For example, the transistor 417 acts as a select switch and is turned on responsive to receiving the pixel select signal and the transistor 418 acts as a refresh switch and is turned on responsive to receiving a pixel refresh signal. For turning on the select switch, the transistor 415 (T1) controls the charging of the capacitor 416 (C1) for the gate bias of the transistor 417 (T3). When the select switch is turned on, a connection is made between an input 426 of refresh circuitry and the pixel along the content data line 422. The refresh circuitry includes the pixel refresh line 412, the gate driver input 411 (Vg2), and the transistor 418 (T2) along the content data line 422. The input 426 of the refresh circuitry along the content data line 422 is represented by a dotted line in FIG. 4.

The pixel refresh line 412 turns on the transistor 418 (T2) when the gate driver sends a refresh signal to all pixels of the line of pixels via the pixel refresh line 412. For example, turning on a transistor may involve changing the voltage of a gate of the transistor. The selected pixel receives the refresh signal via a gate driver input 411 (Vg2). Because the transistor 417 (T3) was previously turned on from the pixel select signal, when the transistor 418 (T2) is turned on from the refresh signal, the pixel is now able to receive content data from the content data line 422 via the source driver output 421 (Vs) because the circuit between the pixel and the source driver is complete. However, for pixels of the line of pixels that did not receive the pixel select signal, the transistor 417 (T3) remains off, and, accordingly, the circuit between the unselected pixel and the source driver remains broken along the content data line 422 at the transistor 417 (T3) when the refresh signal turns on the transistor 418 (T2)

in unselected pixels of the line of pixels. Accordingly, unselected pixels of the line of pixels do not receive content data responsive to receiving the refresh signal from the gate driver via the pixel refresh line 412.

In other words, when the select switch is off, and the refresh switch is off, a connection between the source driver and the pixel along the content data line 422 is not enabled. Likewise, when the select switch is turned on, but the refresh switch is off, a connection between the source driver and the pixel along the content data line 422 is not enabled. Likewise, when the select switch is off, and the refresh switch is turned on, a connection between the source driver and the pixel along the content data line 422 is not enabled. However, when both the select switch and the refresh switch are turned on, a connection between the source driver and the pixel along the content data line 422 is enabled. Accordingly, the pixel may only receive content data from the source driver via the content data line 422 when both the select switch and the refresh switch are turned on.

Figure 5:
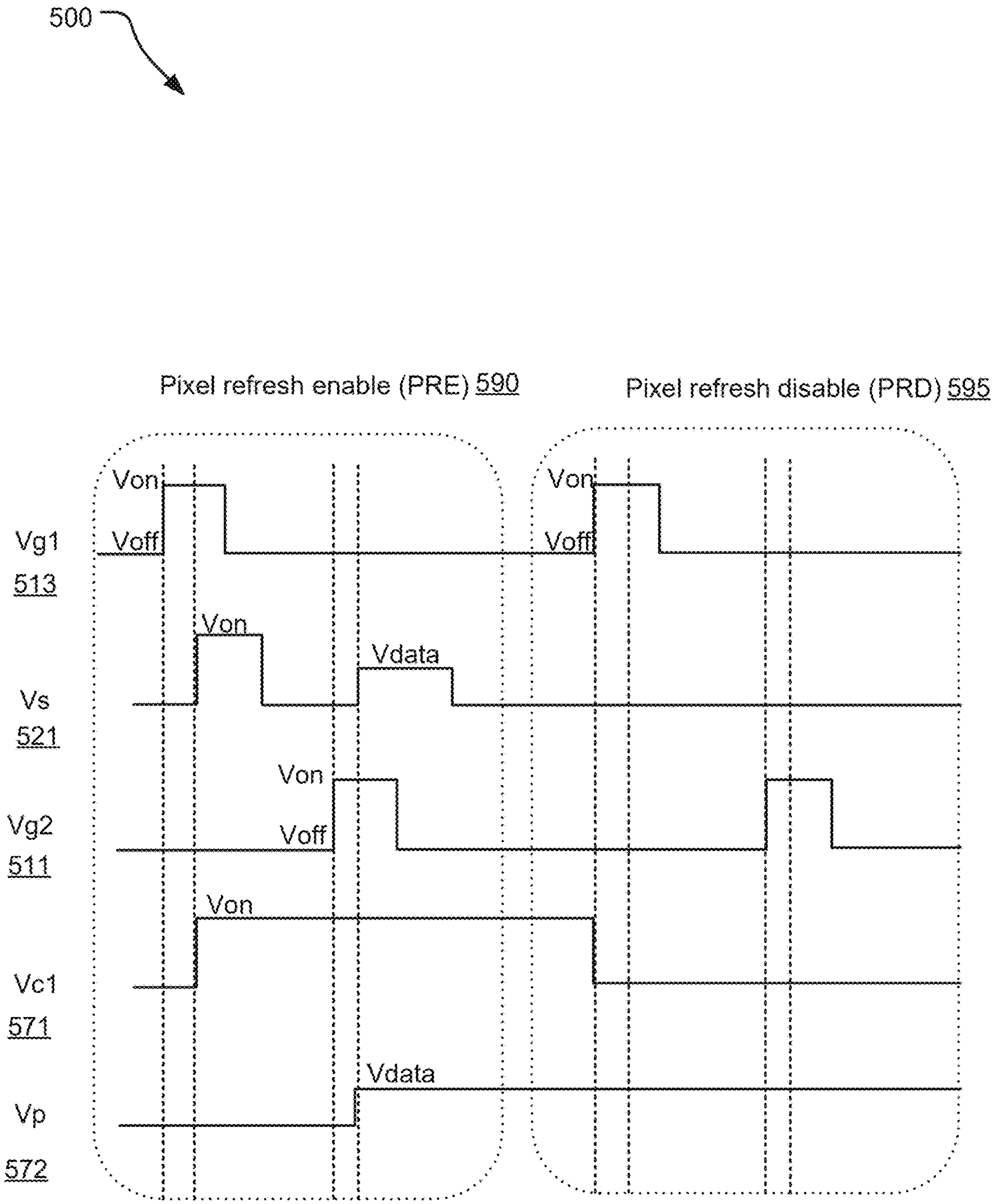
FIG. 5 illustrates an example voltage diagram depicting signals for selecting and unselecting a pixel of a line of pixels for refresh.

FIG. 5 illustrates an example voltage diagram 500 depicting signals for selecting and unselecting a pixel of a line of pixels for refresh. The first gate driver input 513 (Vg1) of the transistor (T1) of the selector circuitry charges the capacitor 571 (Vc1) of the selector circuitry to enable (Von) or disable (Voff) pixel refresh. Vp represents the pixel voltage. When the capacitor 571 (Vc1) of the selector circuitry is charged to Von, the transistor (T3) along the source driver input line 511 (Vg2) in the selector circuitry is ON, and the pixel is in a pixel refresh enable (PRE) state 590. Otherwise, when the capacitor 571 (Vc1) of the selector circuitry is charged to Voff (e.g., is not charged), the transistor (T3) along the source driver input line 521 (Vs) in the selector circuitry is OFF, and the pixel is in a pixel refresh disable (PRD) state 595. In the PRD state 595, the pixel is not refreshed upon receipt of the refresh signal via the second gate driver line input 572 (Vg2), but in the PRE state 590, the pixel is refreshed (e.g., Vdata) upon receipt of the refresh signal.

Figure 6:
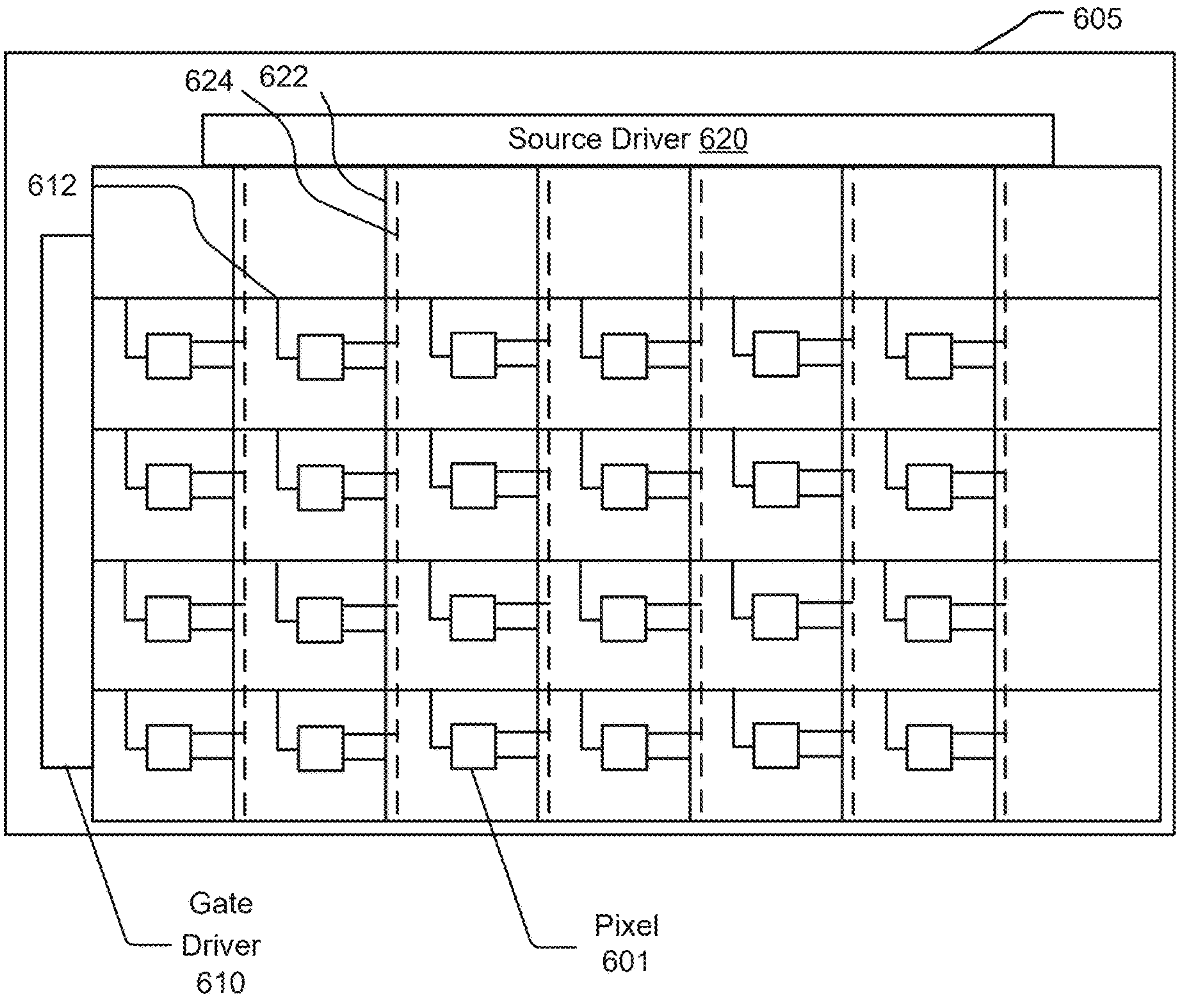
FIG. 6 illustrates an example of selector circuitry in a display of an electronic device.

FIG. 6 illustrates an example of selector circuitry in a display of an electronic device. The display panel 605 includes a set of pixels (e.g., pixel 601), represented as blocks in FIG. 6. The display panel 605 includes a source driver 620 and a plurality of content data lines (e.g., content data line 622). The content data lines are source driver lines. Each of the content data lines couples pixels of a corresponding column of pixels to the source driver 620. The source driver 620 provides content data to pixels of a column of pixels via the corresponding content data line (e.g., the content data line 622). The content data may include a color value for each pixel, such as a red-green-blue (RGB) color value. The content data may represent an image, video frame, display background, or other visual data.

The display panel 605 includes a gate driver 610 and a plurality of pixel refresh lines (e.g., pixel refresh line 612). The pixel refresh lines are gate driver lines. Each of the pixel refresh lines couples pixels of a corresponding line of pixels to the gate driver 610. The gate driver 610 can activate, via a pixel refresh line (e.g., pixel refresh line 612), transistors within pixels of the corresponding line of pixels coupled to the gate driver 610.

Selector circuitry includes a pixel select line (e.g., pixel select line 624) per line (e.g., column) of pixels and a transistor per pixel. In this implementation, the pixel select lines are source driver lines. The pixel select lines (e.g., pixel select line 624) are represented in FIG. 6 with dashed lines. The selector circuitry may further comprise one or more transistors, capacitors, or other circuitry components for each pixel that are coupled to the pixel select lines. In some implementations, until a pixel select signal is received to select one or more pixels of a line of pixels via a corresponding pixel select line, the selector circuitry prevents content data from reaching an input of refresh circuitry of the pixels. Accordingly, even if a refresh signal is received for the line of pixels, no pixels of the line of pixels can receive content data from their corresponding content data lines without also receiving a select signal.

Figure 7:
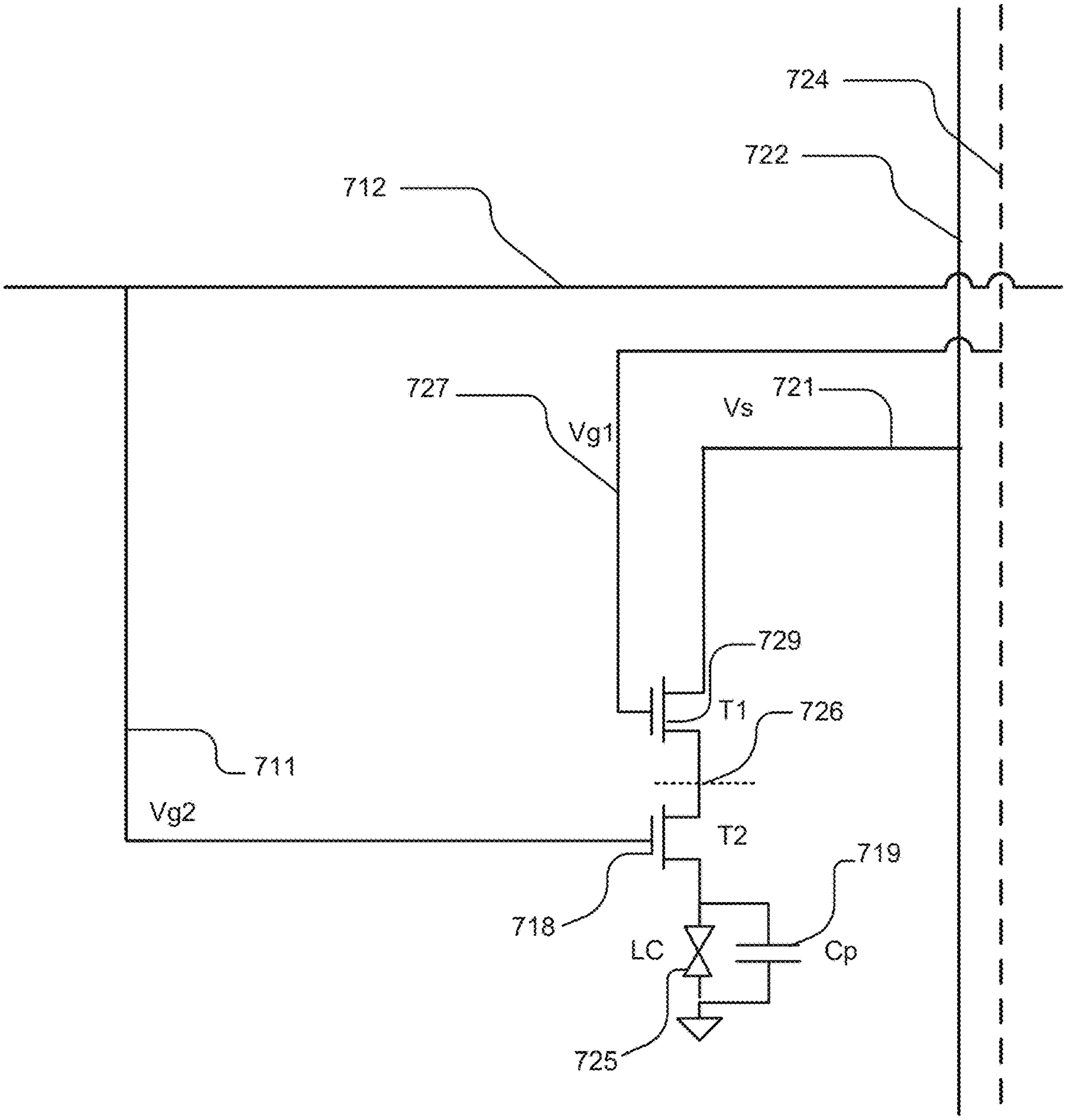
FIG. 7 illustrates an example of selector circuitry in a display of an electronic device for the selection of a pixel of a line of pixels.

In some examples, a subset (e.g., a single pixel or a plurality of pixels but less than all of the pixels) of pixels of a line of pixels is selected. In some examples, all pixels of a line of pixels are selected. The pixel select line may be used to send the pixel select signal to a selected pixel. Sending the pixel select signal may include turning on one or more transistors of the selector circuitry of the corresponding selected pixels via the pixel select line (e.g., pixel select line 624) of the selector circuitry FIG. 7 illustrates an example of selector circuitry in a display of an electronic device for the selection of a pixel of a line of pixels. The pixel is coupled to a pixel refresh line 712 via a gate driver input 711 (Vg2) and to a content data line 722 via a source driver input 721 (Vs). The pixel refresh line 712 is a gate driver line, and the content data line 722 is a source driver line.

The selector circuitry includes the pixel select line 724, a transistor 729 (T1) along the source driver input 721 (Vs), and a source driver input 727 (Vg1) that couples the transistor 729 (T1) to the pixel select line 724. The selector circuitry supports a Source/Gate driving scheme for individual pixel control and refresh. The display panel has one pixel refresh line and two source driver outputs (e.g., a pixel select line and a content data line) per pixel. In the pixel circuit, the transistor 729 (T1) is cascaded to a transistor 718 (T2) from the source driver input 721 (Vs). The transistor 729 (T1) and the transistor 718 (T2) serve as switches to control the pixel voltage of the liquid crystal 725 (LC) and capacitor 719 (Cp). For example, the transistor 729 acts as a select switch and is turned on responsive to receiving the pixel select signal and the transistor 718 acts as a refresh switch and is turned on responsive to receiving a pixel refresh signal. The second source driver input, 727 (Vg1), of the transistor 729 (T1) comes from the source driver. The source driver controls the individual pixel in a line of pixels to be selected (or not selected) for refresh by applying, for each selected pixel in the line of pixels, voltages to the transistor 729 (T1) via the pixel select line 724 corresponding to the selected pixel. When the select switch is turned on, a connection is made between an input 726 of refresh circuitry along the content data line 722 and the source driver. The refresh circuitry includes the pixel refresh line 712, the gate driver input 711 (Vg2), and the transistor 718 (T2) along the content data line 722. The input 726 of the refresh circuitry along the content data line 722 is represented by a dotted line in FIG. 7.

The gate driver, via the pixel refresh line 712, turns on the transistor 718 (T2) when sending a refresh signal to all pixels of the line of pixels. The selected pixel receives the refresh signal via the gate driver input 711 (Vg2). Because the transistor 729 (T1) was previously turned on from the pixel select signal, when the transistor 718 (T2) is turned on from the refresh signal, the pixel is then able to receive content data from the content data line 722 via the source driver input 721 (Vs) because the circuit between the pixel and the source driver is complete. However, for pixels of the line of pixels that did not receive the pixel select signal, the transistor 729 (T1) remains off. Accordingly, the circuit between the unselected pixel and the source driver remains broken when the refresh signal turns on the transistor 718 (T2) in unselected pixels of the line of pixels. Accordingly, unselected pixels of the line of pixels do not receive content data responsive to receiving the refresh signal from the gate driver.

In other words, when the select switch is off, and the refresh switch is off, a connection between the source driver and the pixel along the content data line 722 is not enabled. Likewise, when the select switch is turned on, but the refresh switch is off, a connection between the source driver and the pixel along the content data line 722 is not enabled. Likewise, when the select switch is off, and the refresh switch is turned on, a connection between the source driver and the pixel along the content data line 722 is not enabled. However, when both the select switch and the refresh switch are turned on, a connection between the source driver and the pixel along the content data line 722 is enabled. Accordingly, the pixel may only receive content data from the source driver via the content data line 722 when both the select switch and the refresh switch are turned on. Therefore, the refresh signal, which turns on the refresh switch for each pixel of the row, is only effective for establishing a connection from the source driver to one or more selected pixels of the row having their select switches turned on using the select signal.

Figure 8:
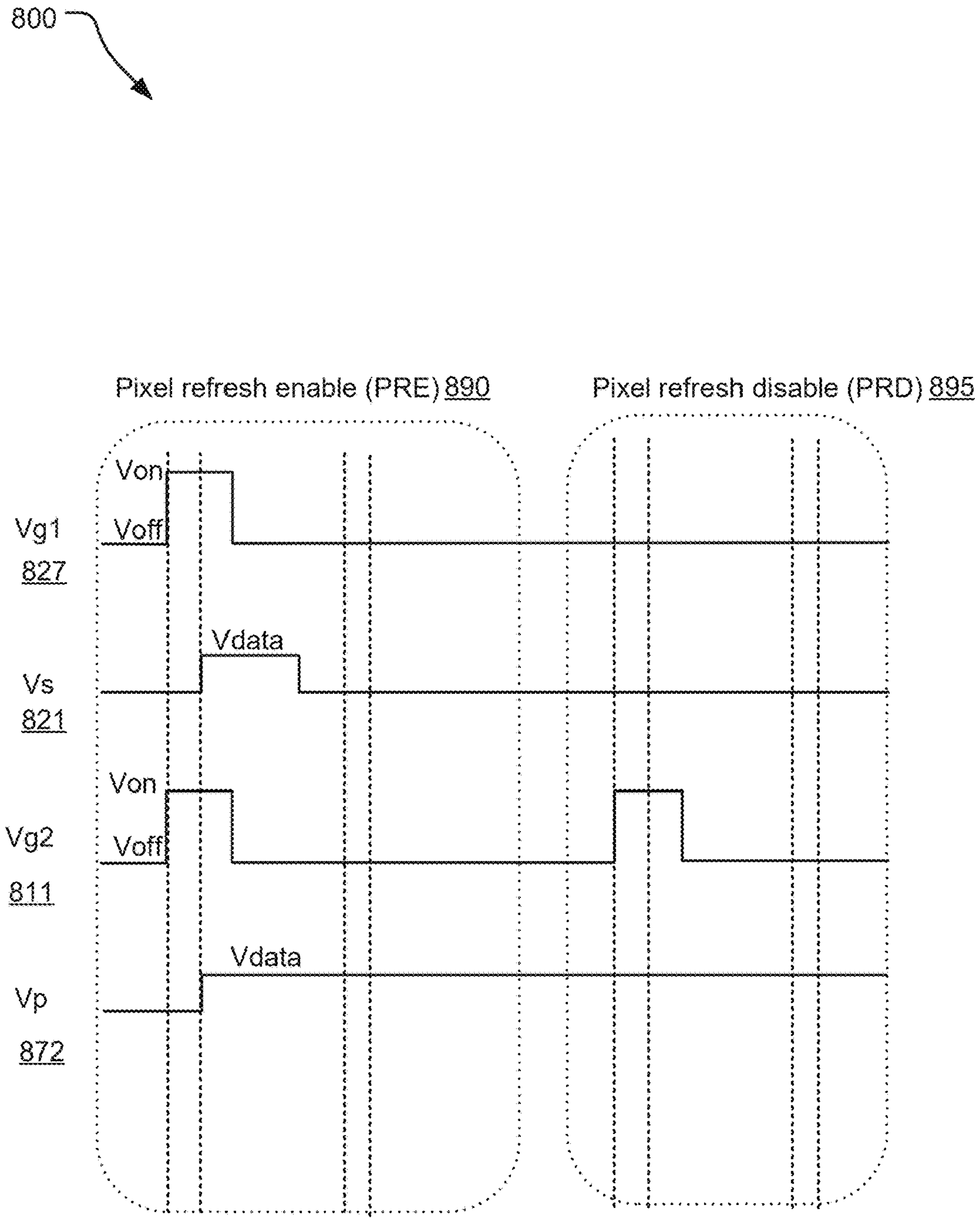
FIG. 8 illustrates an example voltage diagram depicting signals for selecting and unselecting a pixel of a line of pixels for refresh.

FIG. 8 illustrates an example voltage diagram 800 depicting signals for selecting and unselecting a pixel of a line of pixels for refresh. The source driver controls the individual pixel in a line of pixels to be refreshed by applying voltages (Von and Voff). In the pixel control timing diagram, the first source driver input 827 (Vg1) is the gate input of a transistor (T1) to enable (Von) or disable (Voff) pixel refresh. The Vp 872 represents the voltage of the pixel. When the voltage of the first source driver input 827 (Vg1) is Von, the transistor (T1) is ON, and the pixel is in a pixel refresh enable (PRE) 890 status. Otherwise, when the voltage of the first source driver input 827 (Vg1) is Voff, the transistor (T1) is OFF, and the pixel is in a pixel refresh disable (PRD) status 895. In the PRD state 895, the pixel is not able to be refreshed via the source driver input 821 (Vs) when receiving the refresh signal via a gate driver input 811 (Vg2), but in the PRE state 890, the pixel can update (Vdata) through the source driver input 821 (Vs) line.

Figure 9:
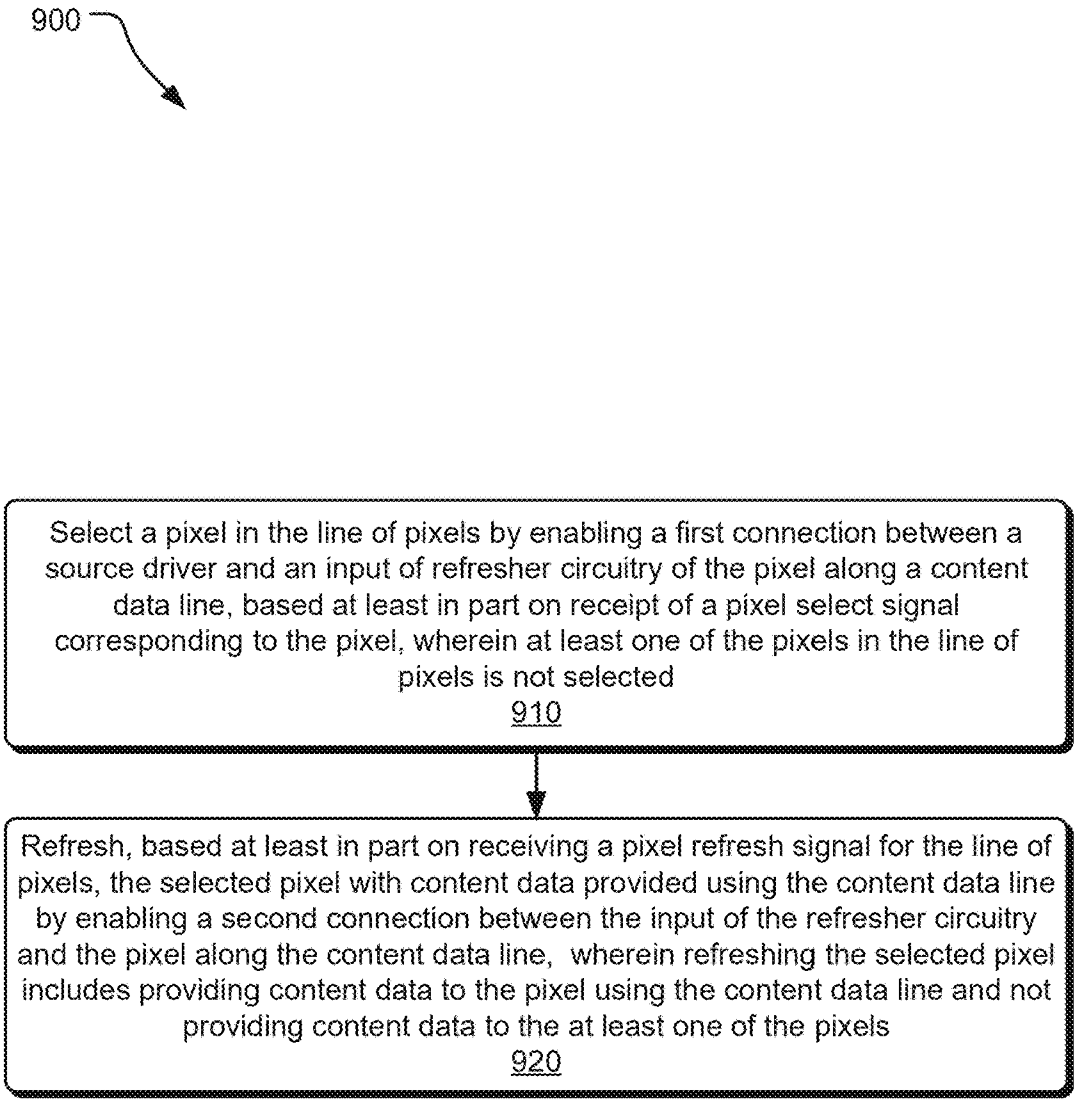
FIG. 9 illustrates a method of selectively refreshing a pixel in a line of pixels of a display.

FIG. 9 illustrates a method 900 of selectively refreshing a pixel in a line of pixels of a display. The method 900 includes a selecting operation 910, and a refreshing operation 920.

The selecting operation 910 a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected. The line of pixels may be a row of pixels or a column of pixels of the display. In some implementations, the pixel select signal is sent using pixel selector circuitry, including a pixel select line. In some implementations, the pixel selector circuitry includes a first transistor along the content data line, wherein the pixel select signal applies a voltage to a gate of the first transistor to enable the first connection. In some implementations, the pixel select line is a source driver line, wherein the pixel select signal is sent by a source driver of the display using the pixel select line. In some implementations, the pixel select line is a gate driver line, wherein the pixel select signal is sent by a gate driver of the display using the pixel select line.

The refreshing operation 920 refreshes, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels. In some implementations, the pixel refresh signal is sent using a pixel refresh line of the pixel refresh circuitry and applies a voltage to a gate of a second transistor along the content data line to enable the second connection.

Figure 10:
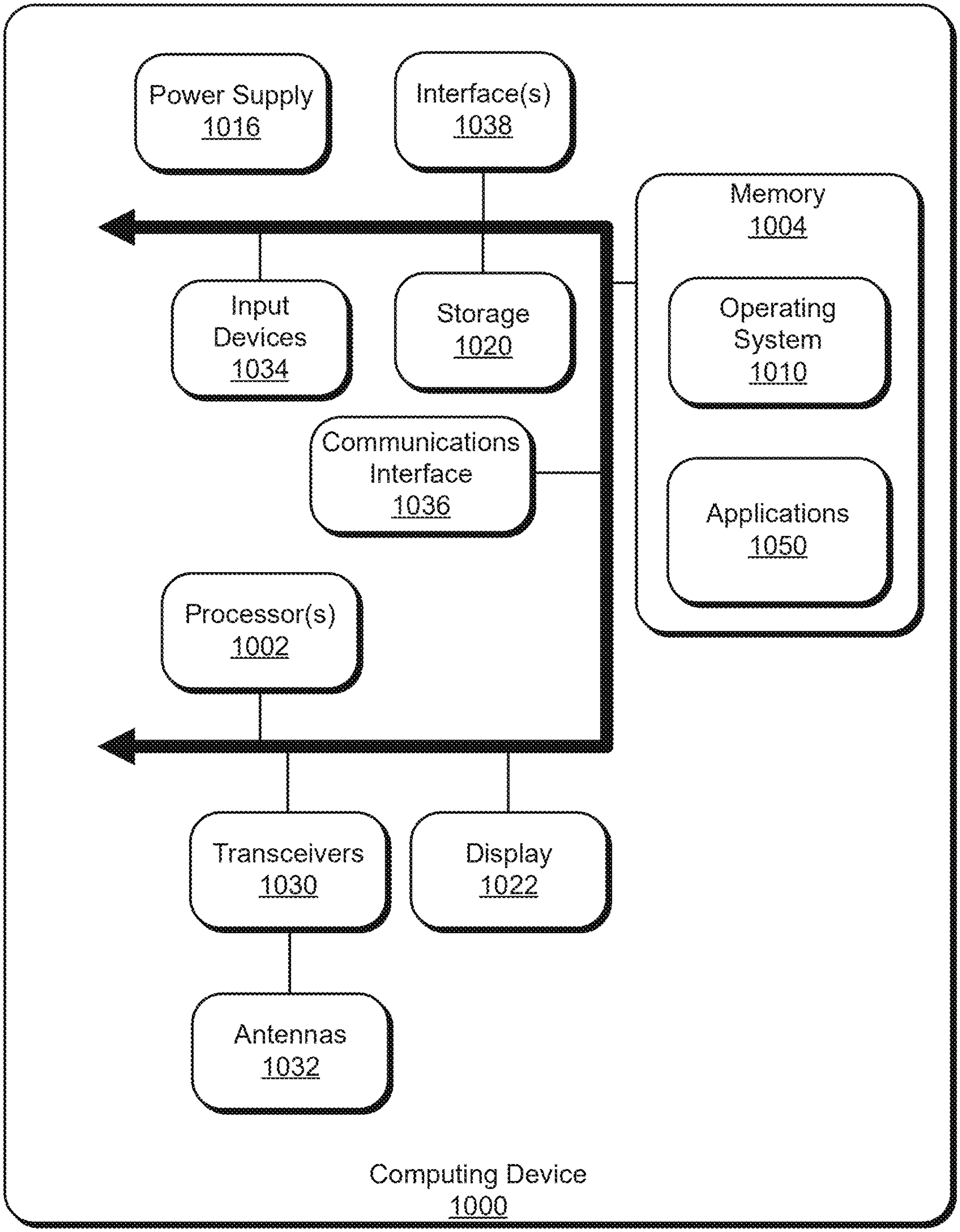
FIG. 10 illustrates an example computing device 1000 for use in implementing the described technology.

FIG. 10 illustrates an example computing device 1000 for use in implementing the described technology. The computing device 1000 may be a client computing device (such as a laptop computer, a desktop computer, or a tablet computer), a server/cloud computing device, an Internet-of-Things (IoT), any other type of computing device, or a combination of these options. The computing device 1000 includes one or more hardware processor(s) 1002 and a memory 1004. The memory 1004 generally includes both volatile memory (e.g., RAM) and nonvolatile memory (e.g., flash memory), although one or the other type of memory may be omitted. An operating system 1010 resides in the memory 1004 and is executed by the processor(s) 1002. In some implementations, the computing device 1000 includes and/or is communicatively coupled to storage 1020.

In the example computing device 1000, as shown in FIG. 10, one or more software modules, segments, and/or processors, such as a source driver, a gate driver, a display panel, an image processing unit, a pixel selector, a pixel refresher, applications 1050, and other program code and modules are loaded into the operating system 1010 on the memory 1004 and/or the storage 1020 and executed by the processor(s) 1002. The storage 1020 may store data and be local to the computing device 1000 or may be remote and communicatively connected to the computing device 1000. In particular, in one implementation, components of a system for selecting subsets of pixels for refreshment of content data may be implemented entirely in hardware or in a combination of hardware circuitry and software.

The computing device 1000 includes a power supply 1016, which may include or be connected to one or more batteries or other power sources, and which provides power to other components of the computing device 1000. The power supply 1016 may also be connected to an external power source that overrides or recharges the built-in batteries or other power sources.

The computing device 1000 may include one or more communication transceivers 1030, which may be connected to one or more antenna(s) 1032 to provide network connectivity (e.g., mobile phone network, Wi-Fi®, Bluetooth®) to one or more other servers, client devices, IoT devices, and other computing and communications devices. The computing device 1000 may further include a communications interface 1036 (such as a network adapter or an I/O port, which are types of communication devices). The computing device 1000 may use the adapter and any other types of communication devices for establishing connections over a wide-area network (WAN) or local-area network (LAN). It should be appreciated that the network connections shown are exemplary and that other communications devices and means for establishing a communications link between the computing device 1000 and other devices may be used.

The computing device 1000 may include one or more input devices 1034 such that a user may enter commands and information (e.g., a keyboard, trackpad, or mouse). These and other input devices may be coupled to the server by one or more interfaces 1038, such as a serial port interface, parallel port, or universal serial bus (USB). The computing device 1000 may further include a display 1022, such as a touchscreen display.

The computing device 1000 may include a variety of tangible processor-readable storage media and intangible processor-readable communication signals. Tangible processor-readable storage can be embodied by any available media that can be accessed by the computing device 1000 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. Tangible processor-readable storage media includes but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1000. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of selectively refreshing a pixel in a line of pixels of a display, the method comprising: selecting a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and refreshing, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

Clause 2. The method of clause 1, wherein the pixel select signal is sent using pixel selector circuitry, including a pixel select line.

Clause 3. The method of clause 2, wherein the pixel selector circuitry includes a first transistor along the content data line, wherein the pixel select signal applies a voltage to a gate of the first transistor to enable the first connection.

Clause 4. The method of clause 2, wherein the pixel select line is a source driver line, wherein the pixel select signal is sent by a source driver of the display using the pixel select line.

Clause 5. The method of clause 2, wherein the pixel select line is a gate driver line, wherein the pixel select signal is sent by a gate driver of the display using the pixel select line.

Clause 6. The method of clause 1, wherein the pixel refresh signal is sent using a pixel refresh line of the pixel refresh circuitry and applies a voltage to a gate of a second transistor along the content data line to enable the second connection.

Clause 7. The method of clause 1, wherein the line of pixels is a row of pixels or column of pixels of the display.

Clause 8. One or more tangible processor-readable storage media embodied with instructions for executing on one or more processors and circuits of a computing device a process for selectively refreshing a pixel in a line of pixels of a display, the process comprising: selecting a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and refreshing, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

Clause 9. The one or more tangible processor-readable storage media of clause 8, wherein the pixel select signal is sent using pixel selector circuitry, including a pixel select line.

Clause 10. The one or more tangible processor-readable storage media of clause 9, wherein the pixel selector circuitry includes a first transistor along the content data line, wherein the pixel select signal applies a voltage to a gate of the first transistor to enable the first connection.

Clause 11. The one or more tangible processor-readable storage media of clause 9, wherein the pixel select line is a source driver line, wherein the pixel select signal is sent by a source driver of the display using the pixel select line.

Clause 12. The one or more tangible processor-readable storage media of clause 9, wherein the pixel select line is a gate driver line, wherein the pixel select signal is sent by a gate driver of the display using the pixel select line.

Clause 13. The one or more tangible processor-readable storage media of clause 8, wherein the pixel refresh signal is sent using a pixel refresh line of the pixel refresh circuitry and applies a voltage to a gate of a second transistor along the content data line to enable the second connection.

Clause 14. The one or more tangible processor-readable storage media of clause 8, wherein the line of pixels is a row of pixels or column of pixels of the display.

Clause 14. A computing system for selectively refreshing a pixel in a line of pixels of a display, the computing system comprising: one or more hardware processors; a pixel selector executable by the one or more hardware processors and configured to select a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and a pixel refresher executable by the one or more hardware processors and configured to refresh, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

Clause 15. The computing system of clause 14, wherein the pixel select signal is sent using pixel selector circuitry, including a pixel select line.

Clause 16. The computing system of clause 15, wherein the pixel selector circuitry includes a first transistor along the content data line, wherein the pixel select signal applies a voltage to a gate of the first transistor to enable the first connection.

Clause 17. The computing system of clause 15, wherein the pixel select line is a source driver line, wherein the pixel select signal is sent by a source driver of the display using the pixel select line.

Clause 18. The computing system of clause 15, wherein the pixel select line is a gate driver line, wherein the pixel select signal is sent by a gate driver of the display using the pixel select line.

Clause 19. The computing system of clause 14, wherein the pixel refresh signal is sent using a pixel refresh line of the pixel refresh circuitry and applies a voltage to a gate of a second transistor along the content data line to enable the second connection.

Clause 20. The computing system of clause 14, wherein the line of pixels is a row of pixels or column of pixels of the display.

Clause 21. A system of selectively refreshing a pixel in a line of pixels of a display, comprising: means for selecting a pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and means for refreshing, based at least in part on receiving a pixel refresh signal for the line of pixels, the selected pixel with content data provided using the content data line by enabling a second connection between the input of the refresh circuitry and the pixel along the content data line, wherein refreshing the selected pixel includes providing content data to the pixel using the content data line and not providing content data to the at least one of the pixels.

Clause 22. The system of clause 21, wherein the pixel select signal is sent using pixel selector circuitry, including a pixel select line.

Clause 23. The system of clause 22, wherein the pixel selector circuitry includes a first transistor along the content data line, wherein the pixel select signal applies a voltage to a gate of the first transistor to enable the first connection.

Clause 24. The system of clause 22, wherein the pixel select line is a source driver line, wherein the pixel select signal is sent by a source driver of the display using the pixel select line.

Clause 25. The system of clause 22, wherein the pixel select line is a gate driver line, wherein the pixel select signal is sent by a gate driver of the display using the pixel select line.

Clause 26. The system of clause 21, wherein the pixel refresh signal is sent using a pixel refresh line of the pixel refresh circuitry and applies a voltage to a gate of a second transistor along the content data line to enable the second connection.

Clause 27. The system of clause 21, wherein the line of pixels is a row of pixels or column of pixels of the display.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed:

1. A method of selectively refreshing a pixel in a line of pixels of a display, the method comprising:
selecting the pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and
refreshing, based at least in part on receiving a pixel refresh signal for the line of pixels sent using a pixel refresh line of the refresh circuitry to a refresh switch of the pixel along the content data line, the pixel with content data provided using the content data line by enabling a second connection between the input of the refresh circuitry and the pixel along the content data line, wherein sending the pixel refresh signal to the refresh switch of the pixel applies a voltage to a gate of a second transistor of the refresh switch along the content data line to enable the second connection, and refreshing the pixel includes providing content data to the pixel using the content data line and not providing content data to the at least one of the pixels.

2. The method of claim 1, wherein the pixel select signal is sent using pixel selector circuitry, including a per-pixel select line electrically coupled to a selector switch of the pixel, the selector switch of the pixel enabling the first connection upon receipt of the pixel select signal via the per-pixel select line.

3. The method of claim 2, wherein the selector switch includes a first transistor along the content data line, wherein the pixel select signal applies a voltage to a gate of the first transistor to enable the first connection.

4. The method of claim 2, wherein the per-pixel select line is a source driver line electrically coupled to the selector switch and the source driver, wherein the pixel select signal is sent by the source driver using the per-pixel select line.

5. The method of claim 2, wherein the per-pixel select line is a gate driver line electrically coupled to the selector switch and a gate driver, wherein the pixel select signal is sent by the gate driver using the per-pixel select line.

6. The method of claim 1, wherein the line of pixels is a row of pixels or column of pixels of the display.

7. One or more tangible processor-readable storage media embodied with instructions for executing on one or more processors and circuits of a computing device a process for selectively refreshing a pixel in a line of pixels of a display, the process comprising:
selecting the pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and
refreshing, based at least in part on receiving a pixel refresh signal for the line of pixels sent using a pixel refresh line of the refresh circuitry to a refresh switch of the pixel along the content data line, the pixel with content data provided using the content data line by enabling a second connection between the input of the refresh circuitry and the pixel along the content data line, wherein sending the pixel refresh signal to the refresh switch of the pixel applies a voltage to a gate of a second transistor of the refresh switch along the content data line to enable the second connection, and refreshing the pixel includes providing content data to the pixel using the content data line and not providing content data to the at least one of the pixels.

8. The one or more tangible processor-readable storage media of claim 7, wherein the pixel select signal is sent using pixel selector circuitry, including a per-pixel select line electrically coupled to a selector switch of the pixel, the selector switch of the pixel enabling the first connection upon receipt of the pixel select signal via the per-pixel select line.

9. The one or more tangible processor-readable storage media of claim 8, wherein the selector switch includes a first transistor along the content data line, wherein the pixel select signal applies a voltage to a gate of the first transistor to enable the first connection.

10. The one or more tangible processor-readable storage media of claim 8, wherein the per-pixel select line is a source driver line electrically coupled to the selector switch and the source driver, wherein the pixel select signal is sent by the source driver using the per-pixel select line.

11. The one or more tangible processor-readable storage media of claim 8, wherein the per-pixel select line is a gate driver line electrically coupled to the selector switch and a gate driver, wherein the pixel select signal is sent by the gate driver using the per-pixel select line.

12. A computing system for selectively refreshing a pixel in a line of pixels of a display, the computing system comprising:
one or more hardware processors;
a pixel selector executable by the one or more hardware processors and configured to select the pixel in the line of pixels by enabling a first connection between a source driver and an input of refresh circuitry of the pixel along a content data line, based at least in part on receipt of a pixel select signal corresponding to the pixel, wherein at least one of the pixels in the line of pixels is not selected; and
a pixel refresher executable by the one or more hardware processors and configured to refresh, based at least in part on receiving a pixel refresh signal for the line of pixels sent using a pixel refresh line of the refresh circuitry to a refresh switch of the pixel along the content data line, the pixel with content data provided using the content data line by enabling a second connection between the input of the refresh circuitry and the pixel along the content data line, wherein sending the pixel refresh signal to the refresh switch of the pixel applies a voltage to a gate of a second transistor of the refresh switch along the content data line to enable the second connection, and refreshing the pixel includes providing content data to the pixel using the content data line and not providing content data to the at least one of the pixels.

13. The computing system of claim 12, wherein the pixel select signal is sent using pixel selector circuitry, including a per-pixel select line electrically coupled to a selector switch of the pixel, the selector switch of the pixel enabling the first connection upon receipt of the pixel select signal via the per-pixel select line.

14. The computing system of claim 13, wherein the selector switch includes a first transistor along the content data line, wherein the pixel select signal applies a voltage to a gate of the first transistor to enable the first connection.

15. The computing system of claim 13, wherein the per-pixel select line is a source driver line electrically coupled to the selector switch and the source driver, wherein the pixel select signal is sent by the source driver using the per-pixel select line.

16. The computing system of claim 13, wherein the per-pixel select line is a gate driver line electrically coupled to the selector switch and a gate driver, wherein the pixel select signal is sent by a gate driver using the per-pixel select line.

17. The computing system of claim 12, wherein the line of pixels is a row of pixels or column of pixels of the display.

18. The method of claim 1, wherein the source driver provides the content data to the pixel along the content data line.

19. The method of claim 1, wherein refreshing the pixel includes providing the content data to the pixel using the content data line via the first connection along the content data line and the second connection along the content data line.

* * * * *